Jan. 6, 1959 J. R. AINSWORTH ET AL 2,867,262

MACHINES FOR STRAIGHTENING WIRE LEADS OF ELECTRIC COMPONENTS BY ROLLING SAID LEADS BETWEEN SURFACES OF TAPERING PRESSURE MEMBERS

Filed June 3, 1957 5 Sheets-Sheet 1

*Inventors*
John R. Ainsworth
John L. Lutyens
Alan White
By their Attorney
Thomas J. Ryan Jan. 6, 1959 J. R. AINSWORTH ET AL 2,867,262

MACHINES FOR STRAIGHTENING WIRE LEADS OF ELECTRIC COMPONENTS BY ROLLING SAID LEADS BETWEEN SURFACES OF TAPERING PRESSURE MEMBERS

Filed June 3, 1957

5 Sheets-Sheet 2

Inventors
John R. Ainsworth
John L. Lutyens
Alan White
By their Attorney
Thomas J Ryan Inventors
John R. Ainsworth
John L. Lutyens
Alan White
By their Attorney
Thomas J. Ryan Inventors
John R. Ainsworth
John L. Lutyens
Alan White
By their Attorney
Thomas J. Ryan Inventors
John R. Ainsworth
John L. Lutyens
Alan White
By their Attorney
Thomas J. Ryan United States Patent Office 2,867,262

Patented Jan. 6, 1959

2,867,262

MACHINES FOR STRAIGHTENING WIRE LEADS OF ELECTRIC COMPONENTS BY ROLLING SAID LEADS BETWEEN SURFACES OF TAPERING PRESSURE MEMBERS

John Richard Ainsworth, John L. Lutyens, and Alan White, Leicester, England, assignors to United Shoe Machinery Corporation, Flemington, N. J., a corporation of New Jersey Application June 3, 1957, Serial No. 663,210

Claims priority, application Great Britain July 25, 1956

3 Claims. (Cl. 153—39)

This invention relates to machines for operating on slender wire-like articles, and is more particularly concerned with the provision of an improved machine for straightening the leads of electrical components and the like. While the invention is herein illustrated as embodied in a machine for straightening the axial leads of successive electronic components and then taping them in row formation, the invention in its various aspects is not thus limited in its application but may have use in the feeding and treatment of various elongated objects including nonmetallic articles.

Huge quantities of different types of electronic components are being assembled in radio, television and numerous other types of electrical equipment. It is found that mechanical processing such as cutting, forming, and inserting of the leads of these components is facilitated and made reliably uniform when precaution has previously been taken to insure that the leads are initially straight. Frequently components to be installed are rapidly fed in succession to an inserting machine, the components usually being belted in a row by tape extending transversely of their bodies or across their leads. Reels of lead-straightened components belted in this manner may, for example, be mounted on an inserting machine of the type disclosed in an application Serial No. 458,312, filed September 27, 1954, in the names of Leon D. Alderman et al. One type of machine found useful in straightening the leads of components and then belting them in parallel relation and reeling them is disclosed in United States Letters Patent No. 2,771,206, granted November 20, 1956, in the name of Richard W. Daniels et al. A more versatile form of belting machine is disclosed in a copending application Serial No. 601,787, filed August 2, 1956, in the ntme of Thomas W. Snow.

It is a primary object of the present invention to provide a somewhat simplified but improved means for straightening the leads of components and the like, said means to be capable of high output and trouble free in its operation. In accordance with this object and as herein shown and described, a feature of the invention resides in the provision of straightening means comprising a rotary, inner lead-engaging member, an outer lead-engaging member having a concave surface adjacent and complemental to the lead-engaging surface of the inner member, the lead-engaging surface of at least one of these members tapering from a width in excess of the length of the leads to be straightened thereby, and means yieldingly urging the outer lead-engaging member toward the inner lead-engaging member for cooperation therewith. As herein disclosed, there are two coaxially arranged inner members each preferably provided with four circumferentially spaced, tapering lead-engaging surfaces, and two outer, tapering lead-engaging members also disposed coaxially for cooperation with the inner members, respectively, this organization being well adapted to the processing of successive coaxial lead type components. The rotary inner members are driven continuously in the operation of the illustrative machine in a direction such that the narrow ends of tapering lead-engaging surfaces may be considered as leading, and the narrow ends of the cooperating surfaces accordingly are caused first to cooperate upon each lead adjacent to its component body. For this purpose a feed wheel in the form of spaced discs having eight radial lead-receiving slots is arranged coaxially between the rotary lead-straightening members and carries the components in evenly spaced relation over an arcuate path of operation including a friction pad, the wheel being rotated at half the speed of the rotary members to effect lead spinning and progressive straightening.

In accordance with a further feature of the invention, the outer lead-engaging members have their broader end portions mounted, respectively, by pin and slot connection with the machine frame, and springs acting upon these broader portions are effective to increase the pressure exerted on each of the leads by the cooperating lead-engaging surfaces as more of the respective leads are being straightened.

The above and other features of the invention including various other novel details of construction will now be described with more particularity in connection with an illustrative coaxial lead belting machine in which they are embodied, and with reference to the accompanying drawings thereof, in which Fig. 1 is a view in side elevation of an illustrative component straightening and belting machine;

Figure 2:
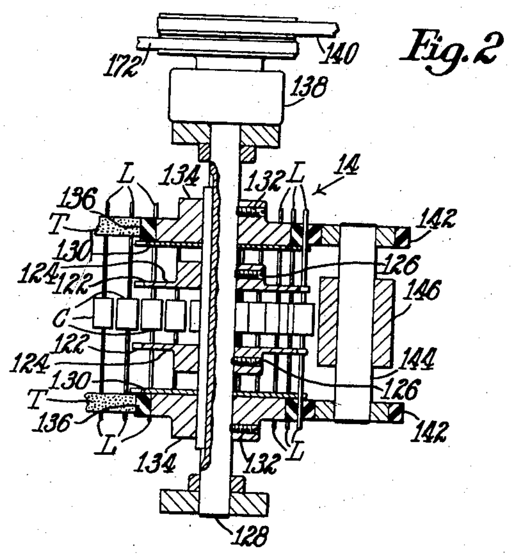
Fig. 2 is a section taken on the line II—II of Fig. 1 and showing lead-taping means.
Figure 3:
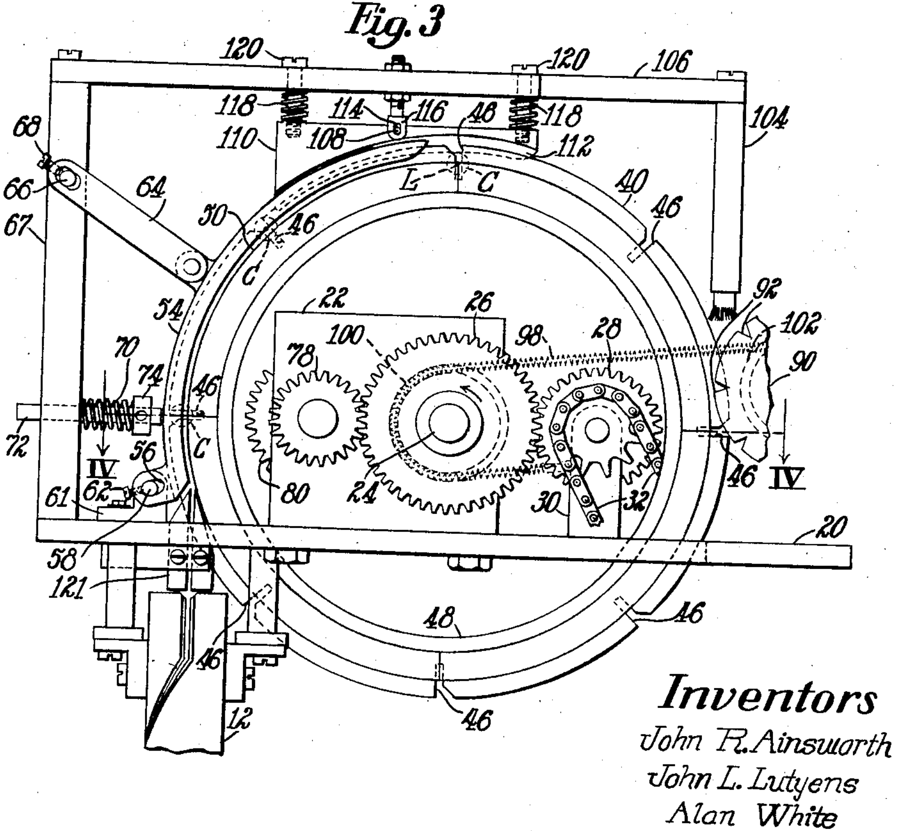
Fig. 3 is an enlarged view of the lead-straightening means shown in Fig. 1.
Figure 5:
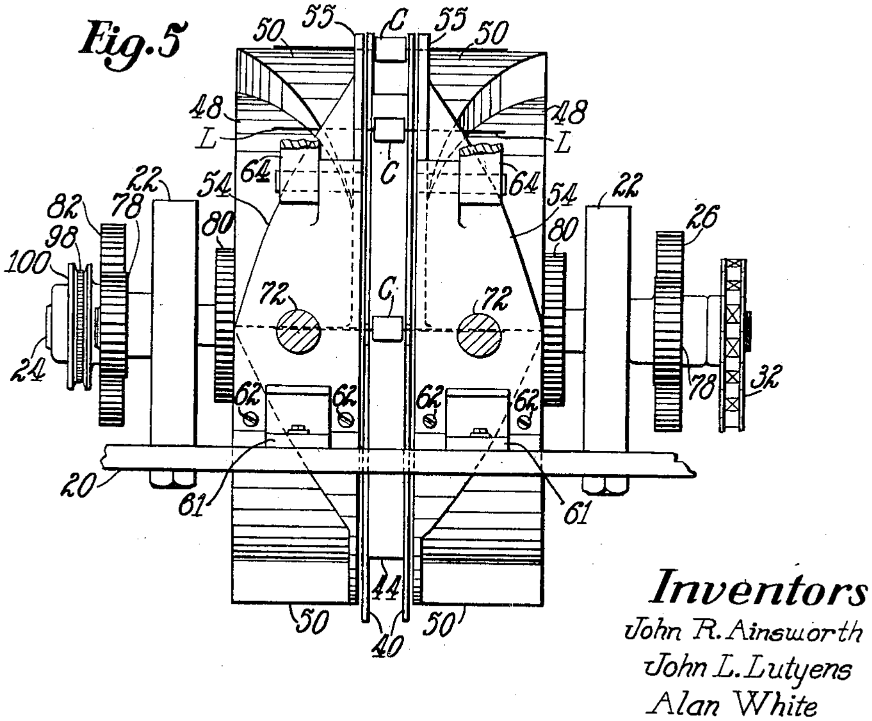
Fig. 5 is a view in front elevation of the lead-straightening means.
Figure 6:
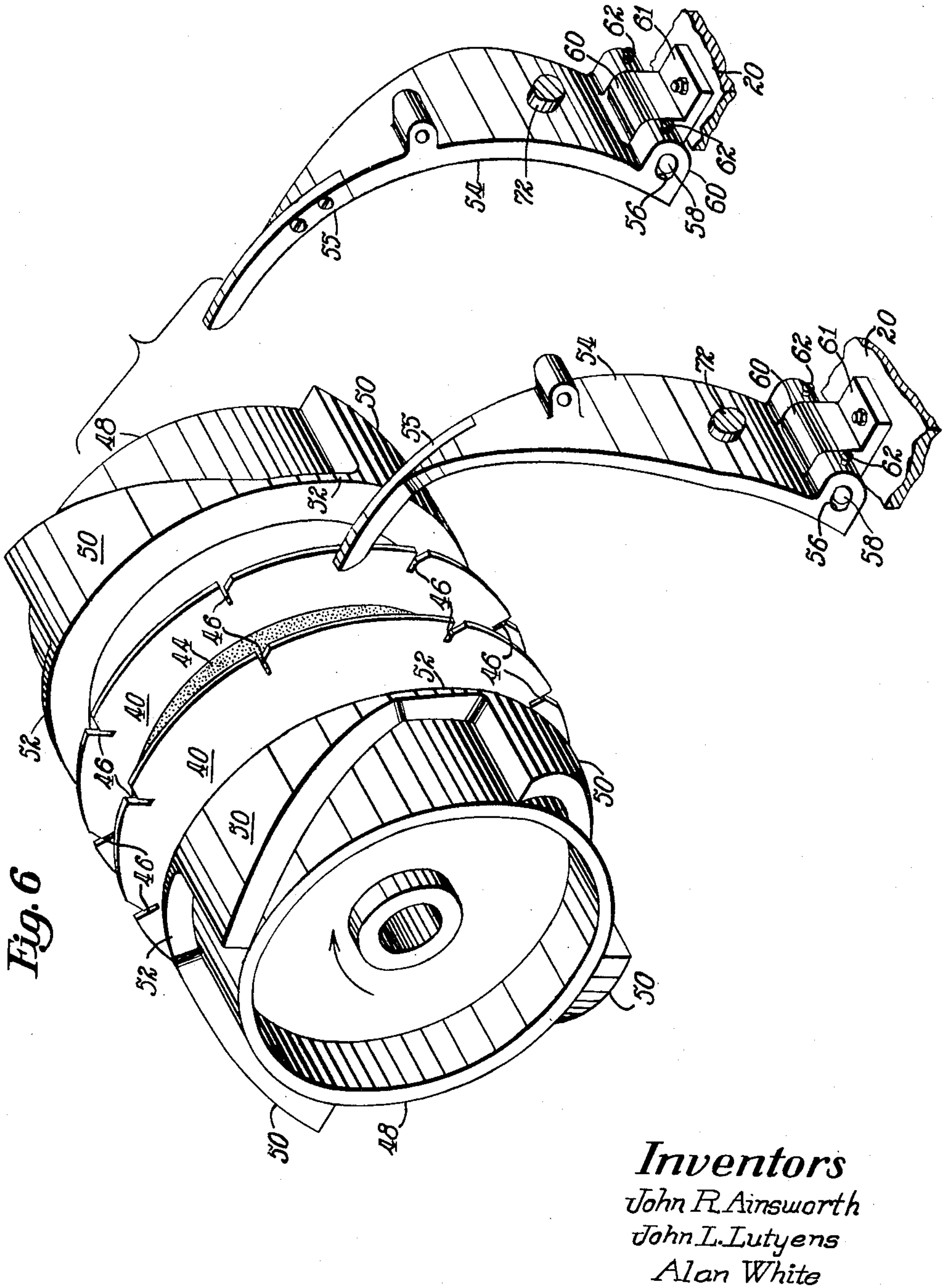
Fig. 6 is an exploded perspective view of the lead-straightening members.

The illustrative machine comprises lead-straightening means generally designated 10 (Figs. 1, 3 and 6) for operating on coaxial leads L of component C (Figs. 2 and 5), a helical raceway 12 (Fig. 1) for receiving the components after being straightened, and means 14 (Figs. 1 and 2) for taping the components in belted relation when received from the raceway. The raceway 12 herein illustrated is of the type disclosed and claimed in a copending application Serial No. 648,538, filed March 26, 1957, in the name of A. A. V. Judge.

Figure 4:
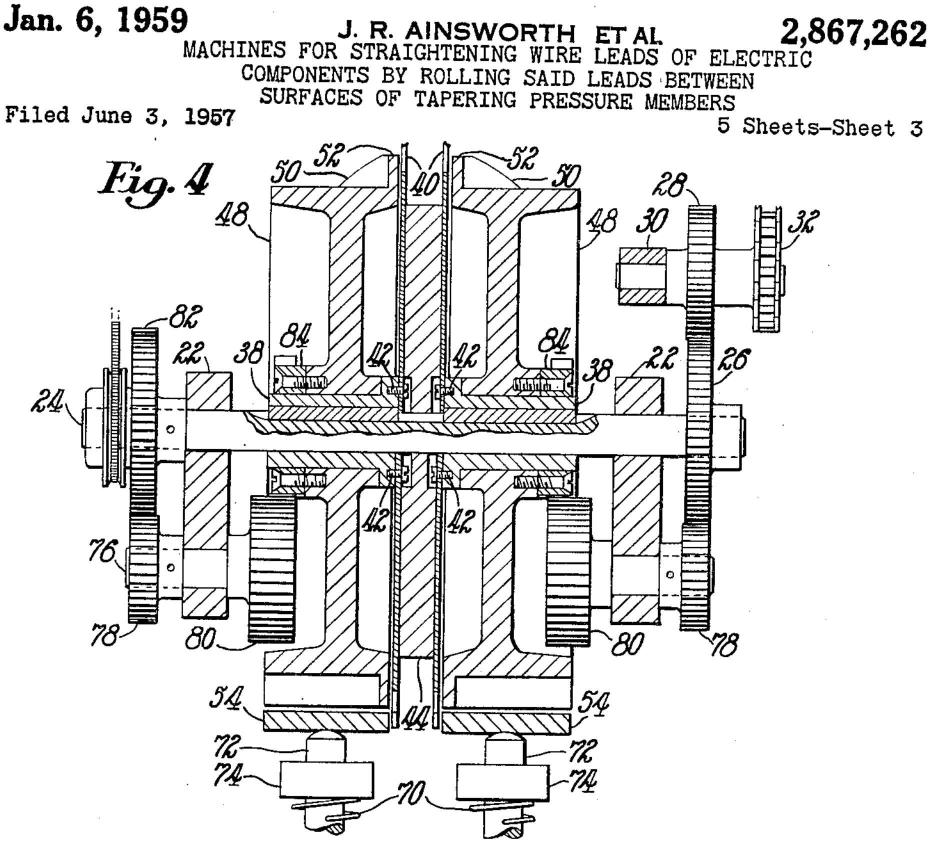
Fig. 4 is a section taken on the line IV—IV of Fig. 3.

Mounted on a main base 16 (Fig. 1) adapted to support the taping means 14 are spaced uprights 18 for supporting a horizontal platform 20 for the lead straightening means 10 about to be described. A pair of bearing blocks 22, 22 (Figs. 1 and 4) secured to the platform 20 rotatably supports a shaft 24 for operating the straightening means 10 and component feeding means axially disposed thereon. The shaft 24 is driven by a gear 26 secured on an end thereof and meshing with a gear 28 supported by a bracket 30 on the platform 20. The gear 28 is continuously driven by a chain 32 having sprocket connection with reduction gearing 34 coupled to a motor 36, the gearing 34 and the motor being mounted on the base 16. Keyed on the shaft 24 are two flanged bushings 38, 38 (Fig. 4). To the flanged inner end of each bushing 38 a disc 40 (Figs. 3, 4 and 6) is secured by means of screws 42, these discs together with a cylindrical spacer 44 mounted between them on the shaft 24 constituting a positively driven feed wheel for advancing the components over a circular path extending through the lead straightening means to be described. The discs are respectively formed with eight radial lead-receiving slots 46 in their perimeters, the slots being evenly spaced in each disc and pairs of the slots being alined axially of the shaft 24.

The lead straightening means 10 comprises a pair of rotary, inner lead straightening members 48 (Figs. 5 and 6) each of which is formed with four peripherally spaced, smooth arcuate lead engaging surfaces 50. These surfaces taper circumferentially from an end having a width, considered axially of the shaft 24, which is greater than the length of the leads to be straightened to an opposite and leading end 52 which is quite narrow and extends substantially parallel to the adjacent disc 40. Thus the discs 40 maintain successive components in parallel relation to each other and to the axis of rotation of the discs, and prevent endwise displacement of the components, each end portion 52 being arranged to engage a lead only adjacent to its component body. For cooperating with the members 48 a pair of outer, correspondingly tapered lead straightening members 54, 54 (Figs. 1, 3 and 6) is provided. Each of these members is provided with an extension or insert 55 (Fig. 6) having parallel sides and which is arranged to correspond with the narrow portion 52 connecting adjacent surfaces 50. The members 54, complemental to the inner members 48, are respectively formed at their broader and lower ends with slots 56 for receiving coaxial pins 58, 58 carried in spaced lugs 60 of brackets 61 respectively secured to the platform 20. For adjustably limiting movement of the lower ends of the members 54, 54 toward the members 48, each of the lugs 60 threadedly receives a screw 62; similarly, for adjusting limiting movement of the upper ends of the members 54, 54 toward the members 48, links 64 pivotally connected at one end to the members 54, 54 respectively have their upper ends slotted to receive pins 66 projecting from a bracket 67 on the platform 20, a screw 68 extending through each of the links for endwise engagement with the pins 66. For yieldingly urging the lower and broader portions of the members 54 to assume positions spaced approximately the diameter of a lead from the members 48, compression springs 70 (Fig. 3) are respectively mounted on plungers 72. The latter respectively extend through bores formed in the bracket 67 and engage the members 54, respectively, endwise by reason of the engagement of corresponding ends of the springs 70 with a collar 74 fixed on each of the plungers, opposite corresponding ends of the springs abutting the brackets 67.

The feed wheel discs 40, in order to control progressive positioning of each component passing through the lead-straightening zone and to cause the portion of a lead-straightening surface 50 coacting at any instant with a lead-straightening portion of the outer member 54 to be substantially equal thereto, are rotated at one-half the speed of the inner lead straightening members 48. This is to say that the tapering surfaces 50 are thus moved relatively to the fixed tapering surfaces of the members 54 in a manner to obtain the most effective interaction on each lead as it is rolled or axially spun between a fixed and a rotary surface. For driving the lead straightening members 48, a stud shaft 76 (Fig. 4) is rotatably journaled in each of the blocks 22 and has secured thereto a gear 78 on one end and a gear 80 on the other end. The gears 78 mesh, one with the gear 26 and one with a similar gear 82 secured on the other end of the shaft 24. The gears 80 mesh with gears 84 (Fig. 4) respectively secured to the members 48.

Various means may be employed to supply successive components to the lead straightening means. As herein shown a wheel 90 (Figs. 1 and 3) comprising spaced parallel discs having peripheral lead receiving slots 92 is rotatably supported on a shaft 94 in a bracket 96 secured on the platform 20. The arrangement is such that coaxial lead components placed on the wheel 90 with their leads respectively in the axially alined slots 92 will be carried to the periphery of the feed wheel discs 40 to be received in their slots 46, rotation of the wheel 90 being arrested if necessary until the walls of a pair of the alined slots 46 can pick up the leads of the component being transferred. For driving the wheel 90 an endless spring belt 98 is operated by a pulley 100 fixed on the shaft 24 and extends about a pulley 102 secured on the shaft 94. For insuring that leads of each component being fed are received in the alined slots 46, a brush 104 preferably depends from an arm 106 extending from the bracket 67 and has its bristles disposed to resist rebound of the leads from the slots 46.

In order to impart preparatory spinning to the successive components about their respective axes as they are about to enter the lead straightening zone and initially to straighten to some extent the more bent leads (which might otherwise incur jamming in the machine), means is provided for acting on the successive component bodies as will now be described. A pivot pin 108 (Fig. 3) extends through a block 110 having an arcuate rubber facing 112 disposed to engage the bodies of components as their leads are being fed by the discs 40 between the inserts 55 and narrow leading portions 52. For yieldingly supporting the block 110 for heightwise movement the pin 108 is received in alined, vertically extending slots 114 formed in a yoke 116 adjustably threaded into the arm 106. Rocking movement of the block 110 about the pin 108 and within the limits imposed by the slots 114 is yieldingly resisted by one or the other of two compression springs 118 respectively mounted on bolts 120, 120, the latter freely extending through bores in the arm 106 and being threaded into the block 110.

Upon being straightened the components emerging from the lower ends of the members 54 are allowed to fall from the slots 46 into the tapered upper end of a vertical raceway 121 (Fig. 1) mounted on and alined with the helical raceway 12. Both raceways 121 and 12 are supported by the platform 20 and serve to conduct the components into successive uppermost slots 122 (Fig. 1) oppositely disposed pairs of which are alined upon the peripheries of a pair of coaxial inner wheels 124, 124 (Fig. 2) constituting a portion of the lead taping means 14 now to be explained. The wheels 124 are secured by screws 126 respectively in longitudinally adjusted positions on a shaft 128 (Figs. 1 and 2) journaled in brackets on the base 16. In similar manner outer portions of the leads L are received in radially slotted outer wheels 130, 130 (Fig. 2) secured on the shaft 128 by means of screws 132. An outboard hub portion 134 of each wheel 130 preferably is provided with a rubber tread 136 arranged to support the leads as they are bound. The shaft 128 is herein shown as being driven (clockwise as viewed in Fig. 1) through a magnetic clutch 138 (Figs. 2 and 7) by means of a belt 140 having operative connection with the reduction gearing 34. For applying pressure-sensitive tapes T, T in confronting relation across the leads L as the latter are advanced in parallel relation by the wheels 124, 130, rubber faced presser rolls 142, 142 (Fig. 2) are mounted on a shaft 144 freely rotatable in one end of an arm 146, the other end of which is pivoted at 148 in the base 16. The rolls 142 are urged yieldingly toward the treads 136 respectively by a compression spring 150 (Fig. 1) mounted on a link 152 which is pivoted at one end to the arm 146 and has its other end slidably extending through a bore formed in the base 16. The arrangement is such that one end of the spring bears on the arm 146 and the other end of the spring abuts the base. Movement of the rolls 142 towards the treads 136 is limited by a nut 154 (Fig. 1) threaded onto the arm 146 and engageable with the base. One pair of the tapes T is supplied from a pair of reels 156 (one only shown in Fig. 1) rotatably supported on a spindle 158, and the other pair of tapes T is supplied from a pair of reels 160 (one shown in Fig. 1) rotatably supported on a spindle 162, both spindles being mounted in brackets secured to the base 16. The tapes respectively pass over one of four idler guide rolls 164 (two shown in Fig. 1) carried by the base before converging between the rolls 142 and the treads 136 to be pressed onto the leads. Successive components are deposited upon the pair of tapes coming from the reels 156 at upper portions of the treads 136 and are carried around to be engaged by the other tapes. As the tapes are thus pulled from their reels, friction means (not shown) restrains the reels against free rotation to maintain the tapes in taut condition. With the pairs of tapes pressed together to hold the components in evenly spaced row formation, the belt is wound upon a storage reel 166 (Fig. 1) detachably mounted on a shaft 168 supported by spaced brackets 170 upstanding from an end of the base 16. The reel 166 is frictionally driven by a belt 172 having pulley connection with the shaft 128.

Figure 1:
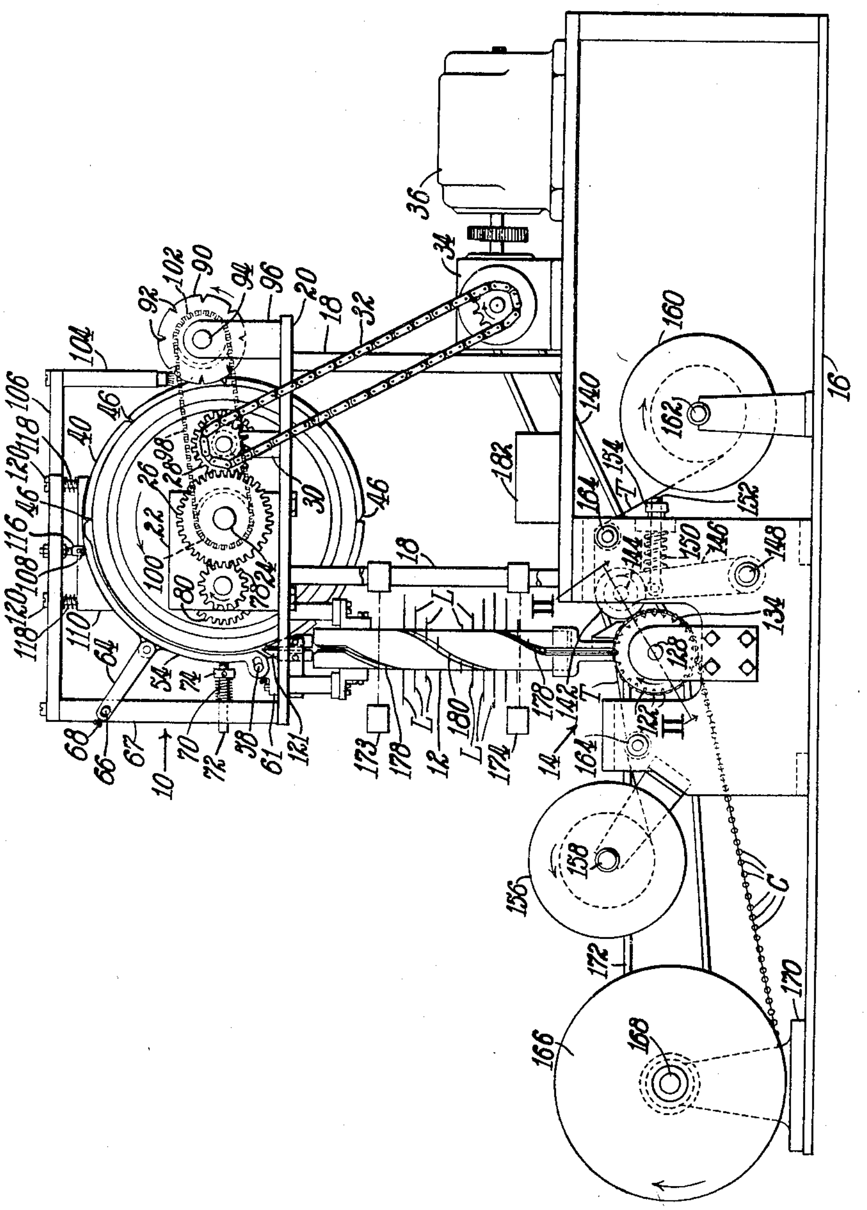
Figure 7:
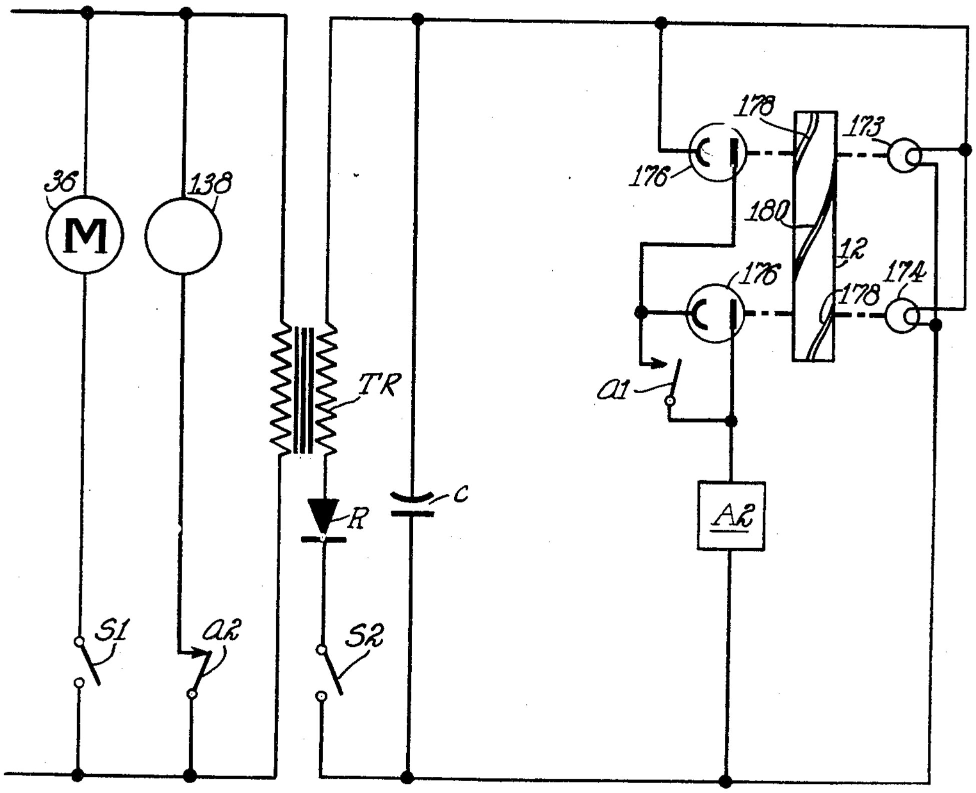
Fig. 7 is an electrical diagram showing the means for controlling the machine.

In order that the components may be belted together in uniformly spaced arrangement (the intervals between adjacent ones corresponding to the pitch of the slots 122), although components may be fed at an irregular rate to the continuously operative lead straightening means, means is provided for controlling operation of the taping means 14 in accordance with the availability of an adequate supply of straightened components in the helical raceway 12. For this purpose, upon manual closure of switches S1 and S2 (Fig. 7), the clutch 138 is actuated electrically by a circuit including a condenser C, a rectifier R, a transformer TR, and component detecting mechanism comprising photoelectric devices 173, 174 (Figs. 1 and 7). These latter are mounted one above the other on one of the uprights 18 and respectively include a cell 176 responsive to a beam of light (indicated by a broken line in Fig. 7) horizontally directed through oppositely disposed helical lead receiving slots 178, 180 and a central vertical bore (not shown) of the raceway 12. The control circuit, part of which is mounted in a housing 182 (Fig. 1) on the base 16, actuates the clutch 138 to drive the shaft 128 when a normally closed contact *a2* (Fig. 7) of a solenoid relay A2 remains closed. The photoelectric devices 173, 174 are in series with the relay A2 so that the latter is energized to open the contact *a2* when the light beams are uninterrupted. Accordingly, as shown herein, the arrangement is such that when the helical reservoir-raceway 12 is nearly empty of components, the contact *a2* is opened and the shaft 128 stops rotation. When the contact *a2* is opened a holding circuit contact *a1* is closed. Hence, as components thereafter accumulate in the raceway, the beam of the lower device 174 is first interrupted and then, when the raceway 12 is nearly full the upper beam is interrupted, but interruption of the lower beam only does not break the relay circuit since it remains energized through the contact *a*1. The upper device 173 is so constructed that it does not respond to mere passage of a component down the raceway 12 but the beam is effectively interrupted only when a component dwells therein at the corresponding level. Thus, upon adequate accumulation of components in the raceway the relay A2 is deenergized and the contact A2 closes to start operation of the taping means 14.

From the foregoing it will be clear that this invention provides an easily operated machine capable of straightening leads effectively and at high output as a preliminary to binding them in belted formation.

Having thus described our invention, what we claim as new and desire to secure by Letters Patent of the United States is:

1. A machine for straightening the coaxial leads of components comprising a frame, a pair of rotary lead-engaging members mounted on the frame and spaced apart to accommodate successive component bodies while engaging their leads, each of said members having formed peripherally thereon evenly spaced, tapering surfaces the narrower ends of which are disposed adjacent to the ends of the component bodies and extend in the direction of rotation, a pair of members yieldingly mounted on the frame for cooperation respectively with the successive tapered surfaces of said rotary members, each of the yieldingly mounted members having a lead-engaging surface complemental to the tapering surfaces and having a narrower end extending opposite to the direction of said rotation, and rotary means for feeding the successive components with their leads extending between the cooperative lead-engaging surfaces, said feeding means being operated at a slower speed than the rotary lead-engaging members.

2. A machine as set forth in claim 1 and further characterized in that means is provided for cooperating with said feeding means to impart an axial spin to the components before they are acted upon by the cooperative lead-engaging surfaces.

3. A machine as set forth in claim 1 and further characterized in that each of said rotary lead-engaging members is provided with four of the evenly spaced, tapering surfaces and said feeding means is operated at one half of the speed of the rotary lead-engaging members.

References Cited in the file of this patent

UNITED STATES PATENTS

| | | |
|---|---|---|
| 994,941 | Lewis | June 13, 1911 |
| 1,071,945 | Moon | Sept. 2, 1913 |
| 1,109,662 | Cavanagh | Sept. 8, 1914 |
| 1,676,918 | Pedersen | July 10, 1928 |
| 1,776,255 | Frontz | Sept. 23, 1930 |
| 1,946,056 | Birdsey | Feb. 6, 1934 |
| 2,622,654 | Frank | Dec. 23, 1952 |
| 2,711,206 | Daniels | Nov. 20, 1956 |
| 2,772,416 | Dorosz | Dec. 4, 1956 |